Jan. 24, 1961    J. A. SMYSER    2,969,096
TIRE SUPPORTING AND INFLATING APPARATUS
Filed Sept. 16, 1957    2 Sheets-Sheet 1

JAMES A. SMYSER
INVENTOR
HUEBNER, BEEHLER & WORREL
ATTORNEYS
BY
Richard M. Worrel Jan. 24, 1961  J. A. SMYSER  2,969,096
TIRE SUPPORTING AND INFLATING APPARATUS
Filed Sept. 16, 1957  2 Sheets-Sheet 2

JAMES A. SMYSER
INVENTOR
HUEBNER, BEEHLER & WORREL
ATTORNEYS
BY

United States Patent Office
2,969,096
Patented Jan. 24, 1961

2,969,096

TIRE SUPPORTING AND INFLATING APPARATUS

James A. Smyser, 207 Harrison St., Taft, Calif.

Filed Sept. 16, 1957, Ser. No. 684,307

8 Claims. (Cl. 144—288)

The present invention relates to a tire supporting and inflating apparatus and more particularly to a pneumatically expansible tire mounting member adapted to expand outwardly into air-tight engagement with the beads of a tire and to contract inwardly therefrom.

The subject invention is a continuation-in-part of my prior copending United States patent application S.N. 678,840, filed August 19, 1957. This invention is a further development in a series dealing with the problems of rotatably mounting a tubeless tire in a work position. It is frequently desirable to mount a tire in this manner for the purpose of resurfacing the tire, immersing the tire to check leaks, to support a load on the tire and for other purposes. Because resurfacing tools apply pressure to the external surfaces of tires for abrading purposes, it is important that the tire be inflated so as to avoid collapse under pressure and that it be precisely concentric to an axis of rotation when inflated.

Briefly, my prior developments in this field have included the provision of an annular air-impervious, resiliently flexible and compressible elastic band circumscribing an expansible rim having a plurality of arcuate segments circumscribing a predetermined axis and mounted by various means for radial movement inwardly and outwardly between a collapsed cylinder forming relation of predetermined diameter and an expanded cylinder forming relation of greater diameter. In the expanded position, the rim urges the band outwardly into air-tight sealing engagement with the beads of a tire mounted in circumscribing relation on the band. In one of my prior inventions, air is introduced into the tire for inflation thereof simultaneously with expansion of the rim and the band outwardly into tire engagement. The instant development relates to improved means adapted to be circumscribed by a tire and expansible outwardly into air-tight sealing engagement with the beads of the tire.

While the described previous developments have been highly successful for their intended purposes, the present invention seeks to provide improvements therein for certain operational environments and requirements.

Accordingly, it is an object of the present invention to provide a pneumatically expansible apparatus for rotatably mounting a tire in work position.

Another object is dependably to mount a tire in work position and to enable inflation of the tire while so mounted.

Another object is simultaneously to provide an annular seal bridging the beads of a tubeless tire and to inflate the tire.

Another object is to provide an inflatable member of rubber or other elastic and flexible material adapted to receive a tire thereon and to expand outwardly when inflated into sealing engagement with the beads of the tire.

Another object is to provide such a device which has a circumscribing tire receiving channel which remains concentric to a predetermined axis during expansion and contraction.

Another object is to provide an inflatable casing adapted to be circumscribed by a tubeless tire which is substantially uniformly distensible outwardly from a predetermined axis in annular sealing engagement with the beads of the tire.

These, together with other objects, will become more fully apparent upon reference to the following description.

Figure 1:
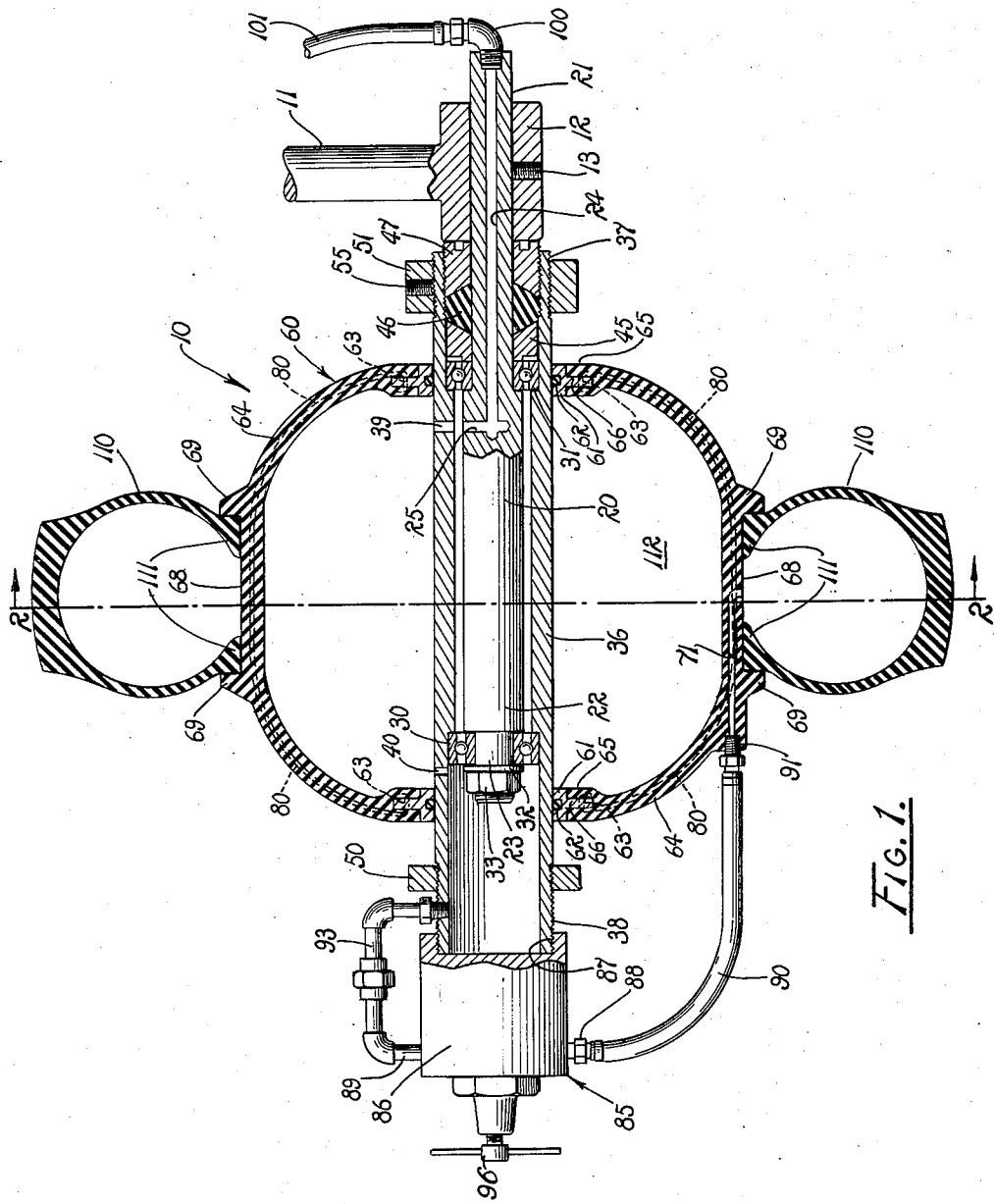
Fig. 1 is an axial section taken through an apparatus embodying the principles of the present invention with a tire mounted thereon in inflated work position and with portions of the apparatus shown in side elevation and other portions broken away for illustrative convenience.
Figure 2:
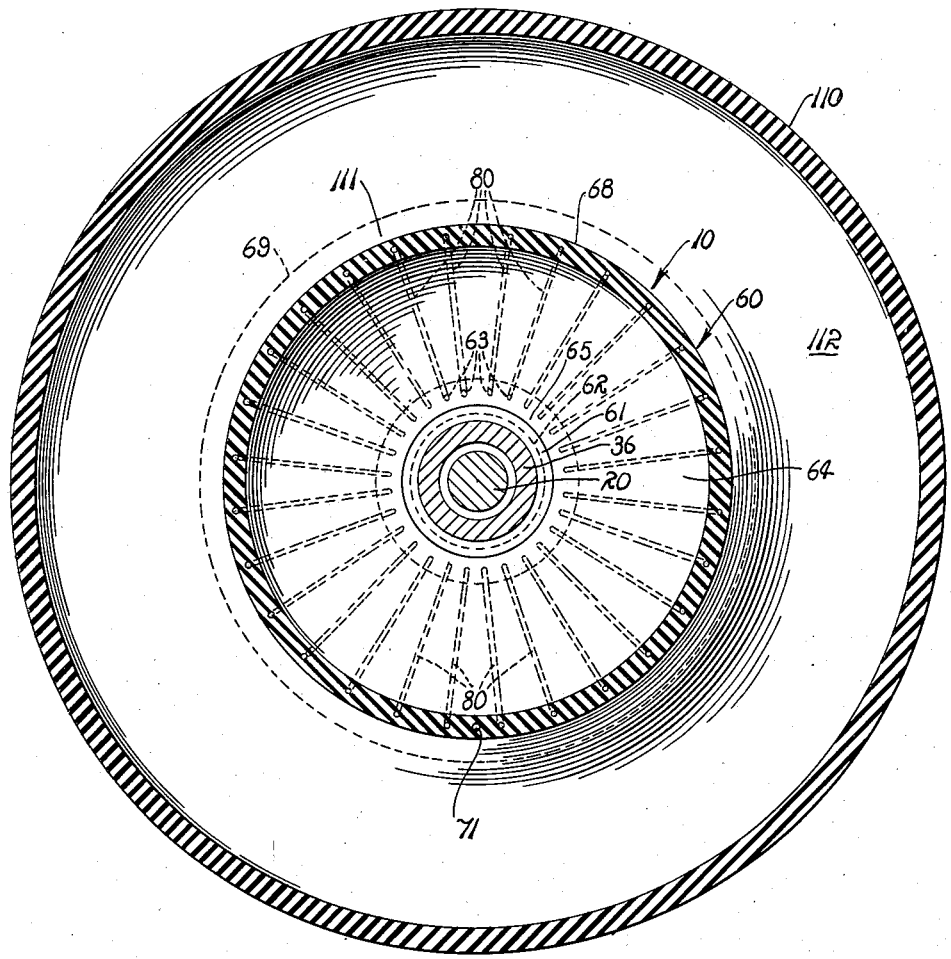
Fig. 2 is a transverse section taken through the apparatus of Fig. 1 with a tire mounted thereon and along a plane at a position represented by line 2—2 of Fig. 1.

Referring in greater detail to the drawings, a tire mounting and inflating apparatus as provided by the present invention is generally indicated by the numeral 10. This apparatus includes a vertical arm 11 constituting a portion of a support frame, not shown in greater detail, and dependently supported in a manner readily understandable by those skilled in the art. The arm includes a lower enlargement 12 having a bore extended therethrough. A setscrew 13 is screw-threadably extended through the enlargement laterally of the bore. An elongated shaft 20 provides a diametrically reduced support end portion 21 extended through the bore of the enlargement 12 and rigidly connected thereto by tightening down on the setscrew 13. The shaft also has an extended end 22 terminating in a reduced portion 23. An elongated axially extended air passage 24 is provided in the support end portion of the shaft and connects to a radially outwardly extended air passage 25 opening externally of the shaft intermediate its end portions.

Bearings 30 and 31 are respectively fitted on the terminal portion 23 and the support end portion 21 of the shaft 20. A washer 32 is fitted over the terminal portion, and a nut 33 is screw-threaded against the washer on said terminal portion.

An elongated cylindrical sleeve 36 includes an internally and externally threaded support end 37 and an externally threaded extended end 38 respectively adjacent to the support and extended ends 21 and 22 of the shaft 20. The sleeve is mounted on the bearings 30 and 31 in circumscribing concentric relation to the shaft for rotatable movement relative to the shaft. (The sleeve has a radially extended aperture 39 adjacent to the support end and a radially extended perforation 40 adjacent to the extended end. Preferably, the aperture is in the same plane transversely of the sleeve and the shaft as the radial air passage 25.

An inner annular packing gland 45 circumscribes the support end 21 of the shaft against the bearing 31. An annular packing 46 of resiliently compressible material circumscribes the support end of the shaft against the inner packing gland, and an outer packing nut 47 of annular form is fitted around the support end of the shaft and screw-threaded into the support end 37 of the sleeve 36 against the packing.

Spaced annular collars 50 and 51 are screw-threadably mounted on the support and the extended ends 37 and 38 of the sleeve 36 and thus are longitudinally adjustably mounted with respect to each other. Further, a setscrew 55 is radially extended through the collar 51 for releasable engagement with the sleeve.

A substantially ellipsoidal or oval annular casing 60 includes a pair of annular shoes 61 longitudinally slidably fitted on the sleeve 36 in longitudinal spaced relation and in circumscribing relation to the sleeve. The shoes provide surfaces slidably engaging the sleeve in which are disposed annular recesses receiving O-rings 62 in slidable air-tight engagement with the sleeve. The shoes also have annular radial rims with eyelets 63 radially outwardly spaced from the sleeve. The casing provides a resiliently flexible and compressible, inflatable, air-impervious wall 64 having opposite ends 65 providing annular pockets 66 in circumscribing fitted relation to said annular radial rims of the shoes and bonded thereto by vulcanization. The ends of the wall are thickened and substantially radially disposed relative to the sleeve 36. The wall is outwardly convexly extended from its ends in spaced, substantially symmetrical, circumscribing relation to the sleeve. From this it will be evident that the casing provides a major axis coaxial with the sleeve and a minor axis substantially normal to the sleeve. The wall includes a central substantially cylindrical tire mounting portion 68 bisected by the plane of the minor axis transversely of the shaft 20, and ribs 69 are radially outwardly extended from the wall in spaced relation axially of the sleeve and on opposite sides of the tire mounting portion. The casing also provides an elongated bore 71 extended therethrough having an end opening outwardly in the tire mounting portion and an opposite end opening outwardly in laterally spaced relation to one of the ribs.

A plurality of substantially semi-elliptical resiliently flexible, convexly curved, stays 80, preferably of spring steel wire, are embedded in fitted relation in the wall 64 of the casing 60 and provide opposite ends individually extended through the eyelets 63 in the shoes 61 and thus connected to the shoes. The stays are disposed in individual substantially equally circumferentially spaced planes radially related to the sleeve 36 and are for the purpose of giving body to the casing. More significantly, the ribs insure substantially uniform and symmetrical expansion and contraction of the casing wall, as will be seen.

An air pressure regulator 85 provides a housing 86 having an internally threaded socket 87 screw-threaded on the extended end 38 of the sleeve 36 in closing relation to this end of the sleeve. The regulator is secured to the sleeve for rotation therewith by the described screw-threaded connection. The regulator includes a tire duct 88 and a supply duct 89. A tire hose 90 provides an end connected to the tire duct and includes a fitting 91 screw-threaded into the laterally outwardly spaced end of the bore 71 in the casing 60. Further a conduit 93 provides an end connected to the supply duct 89 and an opposite end connected to the sleeve at its extended end in air communication with the interior of the sleeve. The regulator may be of any well-known conventional type adapted to provide a predetermined air pressure at the tire duct 88 regardless of the extent of excess air pressure at the supply duct 89.

An elbow 100 provides an end screw-threaded into the outer end of the axial air passage 24 and an opposite end connected to a supply hose 101 adapted to be connected to a source of pneumatic pressure. The pneumatic system is not shown in detail but may be of the type shown and described in my above cited patent application Serial No. 678,840.

*Operation*

The operation of the described embodiment of the subject invention is believed to be readily apparent and is briefly summarized at this point.

With air pressure removed from the supply hose 101 or with vacuum applied thereto, the wall 64 of the casing 60 is deflated. In this condition the shoes 61 are outwardly engaged with the collars 50 and 51. The extent of outward movement of the shoes may be varied by longitudinal adjustment of the collars. Of course, the extent of outward movement of the shoes is limited by the resilience of the stays 80 which prevent complete collapse of the casing.

The apparatus 10 is adjusted by the screw 96 depending on the amount of pressure desired to inflate a tube, as 110. With the casing deflated, the tire is fitted thereover and positioned with its beads 111 rested on the tire mounting portion 68 between the ribs 69.

Pneumatic pressure is applied to the supply hose 101 to introduce air under pressure through the axial air passage 24, the radial air passage 25, and the aperture 38 into the chamber 112 defined by the casing 60 and the sleeve 36. This expands the wall 64 of the casing outwardly and urges the mounting portion 68 outwardly into tight air-sealing engagement with the beads 111 of the tire 110. During such expansion, several actions occur. The stays maintain the casing in elliptical form substantially symmetrical with the sleeve and preclude non-uniform distension of the wall 64. Thus the tire mounting portion expands outwardly in substantially uniformly radially spaced relation to the sleeve circumferentially thereof and into engagement with the beads. Further, outward expansion of the central portion of the wall causes the ends of the stays to slide the shoes 61 inwardly toward each other on the sleeve. The O-rings 62 maintain constant air-tight engagement with the sleeve to provide a dependable air seal.

Simultaneously with distension of the casing 60, air passes from the chamber 112 through the perforation 40 into the extended end of the sleeve 36 and out through the conduit 93 into the air regulator 85 and from there through the tire hose 90 and the bore 71 into the interior of the tire 110 which is gradually being sealed to receive air by the tire mounting portion 68. The tire is thus inflated and air pressure therewithin urges the beads 111 outwardly into air-tight frictional contact with the ribs 69.

When both the casing 60 and the tire 110 are fully inflated, as desired, and with the air pressure maintained, the tire and the casing may be rotated around the shaft 20. In any event, the tire is mounted for rotation in a work position and because it is inflated, pressure may be applied to the external surfaces thereof for the purposes of resurfacing or otherwise working on the tire.

The tire 110 is removed from the apparatus 10 by relieving the air pressure in the supply hose 101. It will be evident that this simultaneously deflates the casing 60 and the tire so the latter can be quickly dismounted.

It will be evident from the foregoing that an advantageous pneumatic apparatus has been provided and featuring an inflatable casing for simultaneously mounting a tire for rotation in a work position and for enabling inflation of the tire while being mounted. The apparatus is simple and dependable in construction and operation and is highly effective for accomplishing its intended purposes.

Although the invention has been herein shown and described in what is conveived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A tire supporting and inflating apparatus comprising an elongated sleeve; an annular inflatable casing having opposite ends fitted in air-tight circumscribing engagement on the sleeve and an expansible wall of resiliently flexible and compressible air-impervious material outwardly extended from said ends in spaced symmetrical circumscribing relation to the sleeve, the wall including a centrally substantially cylindrical circumscribing tire mounting portion adapted to receive a tire having annular beads in circumscribing relation thereon, and spaced annular ribs radially outwardly extended on opposite sides of the tire mounting portion adapted to be engaged by the beads of the tire, the sleeve having an air passage therein communicating with the interior of the casing; a pneumatic system connected to the air passage in the sleeve for supplying air under pressure to the casing to expand the wall outwardly into air-tight engagement with the beads of a tire mounted on the wall; and a plurality of substantially uniformly convexly curved stays of substantially nonelastic resiliently flexible material embedded in the wall of the casing individually positioned in peripherally spaced planes radially related to the sleeve for maintaining the wall concentrically of the sleeve during expansion of the wall outwardly into tire engagement.

2. A tire supporting and inflating apparatus comprising an elongated sleeve, an annular inflatable casing including a pair of annular shoes longitudinally slidably mounted in circumbscribing substantially air-tight engagement on the sleeve in adjustable spaced relation longitudinally thereof and having an expansible wall of somewhat elastic resiliently flexible and compressible air-impervious material secured to the shoes and outwardly convexly extended therefrom in spaced symmetrical circumscribing relation to the sleeve and adapted to receive a tire having annular beads in circumscribing relation thereon, the sleeve having an air passage therein communicating with the interior of the casing, a pneumatic system connected to the air passage in the sleeve for supplying air under pressure to the casing for expanding the wall outwardly into air-tight engagement with the beads of a tire mounted on the wall, and a plurality of substantially uniformly convexly curved stays of substantially non-elastic resiliently flexible material embedded in the wall of the casing, individually positioned in peripherally spaced planes radially related to the sleeve, and having opposite ends individually connected to the shoes whereby upon expansion and contraction of the wall the shoes are longitudinally slidably moved relatively toward and from each other on the sleeve and whereby the stays maintain the wall substantially concentrically of the sleeve during such expansion and contraction.

3. An apparatus for simultaneously inflating a tubeless tire having annular beads and for mounting the tire in a work position comprising a support, an elongated shaft having a support end, an extended end, and an elongated air passage extended axially of the support end of the shaft and having a port to a side of the shaft intermediate said ends thereof; an elongated substantially cylindrical sleeve rotatably mounted on the shaft having a support end adjacent to the support end of the shaft, an extended end adjacent to the extended end of the shaft, a radially disposed aperture in continuous communication with the port of the air passage, and a radially disposed perforation adjacent to the extended end of the shaft; stop collars rotatably mounted on the sleeve in spaced relation longitudinally thereof; a substantially ellipsoidal inflatable casing including a pair of annular shoes longitudinally slidably fitted in circumscribing substantially air-tight relation on the sleeve between the collars so that the aperture and perforation are positioned therebetween and having an expansible wall of resiliently flexible and compressible material having opposite ends substantially radially related to the sleeve and connected to the shoes and outwardly convexly extended in spaced symmetrical circumscribing relation to the sleeve, a pair of axially spaced, annular radially extended ribs on the wall, the wall including a central substantially cylindrical tire mounting portion intermediate the ribs and adapted to receive a tire in circumscribing relation thereto with the beads of the tire adjacent to the ribs, the casing and the sleeve defining an air chamber having communication with the aperture and the perforation in the sleeve, and the wall having a bore extended axially of the wall having an end opening radially outwardly between the ribs and an opposite open end laterally spaced outwardly from the ribs; air conducting means interconnecting the interior of the sleeve and the bore in the casing wall; and pneumatic means connected to the air passage in the shaft for introducing air under pressure into the casing for expanding the mounting portion outwardly into air-tight engagement with the beads of the tire and for introducing air into the tire for inflation thereof through the air conducting means and the bore.

4. The apparatus of claim 3 including a plurality of substantially semi-elliptical uniformly shaped resiliently flexible spring stays embedded in the wall of the casing disposed in angularly spaced planes radially related to the sleeve and having opposite ends individually connected to the shoes, said stays maintaining the wall of the casing substantially symmetrical to the sleeve during expansion of the wall for substantially uniform air-tight engagement of the mounting portion of the casing with the tire.

5. In a tire supporting and inflating apparatus, an annular inflatable casing including a pair of axially aligned annular shoes, an expansible annular wall of somewhat elastic resiliently flexible and compressible air impervious material having opposite axial ends secured to the shoes and being outwardly convexly extended therefrom in interconnection between the shoes and providing a substantially cylindrical diametrically expansible and contractible peripheral portion adapted to receive a tire having annular beads in circumscribing relation thereon and providing a pair of axially spaced diametrically expansible and contractible annular radially extended ribs integral with the wall at opposite ends to the cylindrical portion; and a plurality of substantially uniformly convexly curved stays of substantially non-elastic resiliently flexible material embedded in the wall of the casing in substantially equally angularly related planes radially related to the shoes and having opposite ends individually connected to the shoes; air impervious means rotatably and slidably mounting the shoes in axially spaced relation and air-tight engagement thereon; and air supply means communicating with the interior of the casing for inflating and deflating the same.

6. The supporting and inflating apparatus of claim 1 wherein the opposite ends of the casing are axially slidably mounted on the sleeve for movement toward and away from each other incident to inflation and deflation, respectively, of the casing.

7. In a tire supporting and inflating apparatus; an elongated support; an annular inflatable casing of elastic and flexible material circumscribing the support having opposite ends fitted in air-tight engagement with the support and including a substantially cylindrical, transversely flat, diametrically expansible and contractible tire mounting portion concentric to the support and adapted to receive a tire having annular beads in circumscribing relation thereon, the casing also including a pair of diametrically expansible and contractible annular ribs integrally connected to the time mounting portion and outwardly extended therefrom in axially spaced substantially parallel planes for substantially air-tight engagement with the beads of the tire circumscribing the tire mounting portion between the ribs and incident to movement of the beads laterally outwardly against the ribs upon inflation of the tire, the tire mounting portion having an air passage therein opening outwardly of the casing between the ribs; a source of air under pressure; and pneumatic conducting means connecting said source to the interior of the casing through the support and also connecting the source to said air passage for inflation of the casing and the tire diametrically to expand the tire mounting portion into air-tight engagement with such beads and to inflate the tire to move its beads into said engagement with the ribs.

8. A tire supporting and inflating apparatus comprising an elongated sleeve; an annular inflatable casing having opposite ends fitted in air-tight circumscribing engagement on the sleeve and an expansible wall of resiliently flexible and compressible air-impervious material outwardly extended from said ends in spaced symmetrical circumscribing relation to the sleeve, the wall including a central substantially cylindrical circumscribing tire mounting portion adapted to receive a tire having annular beads in circumscribing relation thereon, and spaced annular ribs radially outwardly extended on opposite sides of the tire mounting portion adapted to be engaged by the beads of the tire, the sleeve having an air passage therein communicating with the interior of the casing; and a pneumatic system connected to the air passage in the sleeve for supplying air under pressure to the casing to expand the wall outwardly into air-tight engagement with the beads of a tire mounted on the wall.

References Cited in the file of this patent

UNITED STATES PATENTS

| | | |
|---|---|---|
| 1,777,405 | Frank | Oct. 7, 1930 |
| 1,785,659 | State | Dec. 16, 1930 |
| 2,182,176 | Maranville | Dec. 5, 1939 |
| 2,399,572 | Powell et al. | Apr. 30, 1946 |
| 2,514,964 | Miller et al. | July 11, 1950 |
| 2,694,247 | Rose | Nov. 16, 1954 |